United States Patent
Cantrell, Jr. et al.

[11] Patent Number: 6,155,229
[45] Date of Patent: Dec. 5, 2000

[54] CHARGE MOTION CONTROL VALVE IN UPPER INTAKE MANIFOLD

[75] Inventors: Douglas David Cantrell, Jr., Ann Arbor; Darice Marie Morris, Wolverine Lake; Mark Allen Bourcier, Plymouth; Keith Daniel Miazgowicz, Dearborn; Michael Bruno Magnan, Dearborn; Patrick Joseph Crowley, Dearborn; Rebecca Frayne Speckhals, Northville; Theodore Thomas Geftos, Dearborn, all of Mich.

[73] Assignee: Ford Global Technologies, Inc., Dearborn, Mich.

[21] Appl. No.: 09/468,682

[22] Filed: Dec. 21, 1999

[51] Int. Cl.⁷ ............................................. F02D 9/08
[52] U.S. Cl. ........................... 123/336; 123/337; 123/432
[58] Field of Search ................................. 123/337, 336, 123/308, 432

[56] References Cited

U.S. PATENT DOCUMENTS

| | | | |
|---|---|---|---|
| 4,494,504 | 1/1985 | Yagi | 123/308 |
| 4,520,775 | 6/1985 | Nakamura | 123/308 |
| 4,538,574 | 9/1985 | Lombardi | 123/432 |
| 4,702,207 | 10/1987 | Hatamura et al. | 123/302 |
| 5,069,175 | 12/1991 | Simko | 123/193 H |
| 5,168,839 | 12/1992 | Hitomi et al. | 123/52 |
| 5,273,014 | 12/1993 | Mitobe et al. | 123/336 |
| 5,592,916 | 1/1997 | Stockhausen | 123/308 |
| 5,636,613 | 6/1997 | Aoyama et al. | 123/432 |
| 5,640,941 | 6/1997 | Hazen et al. | 123/306 |
| 5,799,638 | 9/1998 | Tsuchida et al. | 123/302 |

FOREIGN PATENT DOCUMENTS 62 20639  1/1987  European Pat. Off. .

Primary Examiner—Noah P. Kamen
Assistant Examiner—Mahmoud M Gimie
Attorney, Agent, or Firm—Jerome R. Drouillard

[57] ABSTRACT

An internal combustion engine with charge stratification and directed air flow is provided. A charge motion control valve is positioned in the upper intake manifold and bifurcated intake ports are utilized in the cylinder head which direct the air flow into one intake port when desired. This provides improved engine performance, emissions, and fuel economy with easier packaging and consequently reduced cost.

4 Claims, 3 Drawing Sheets

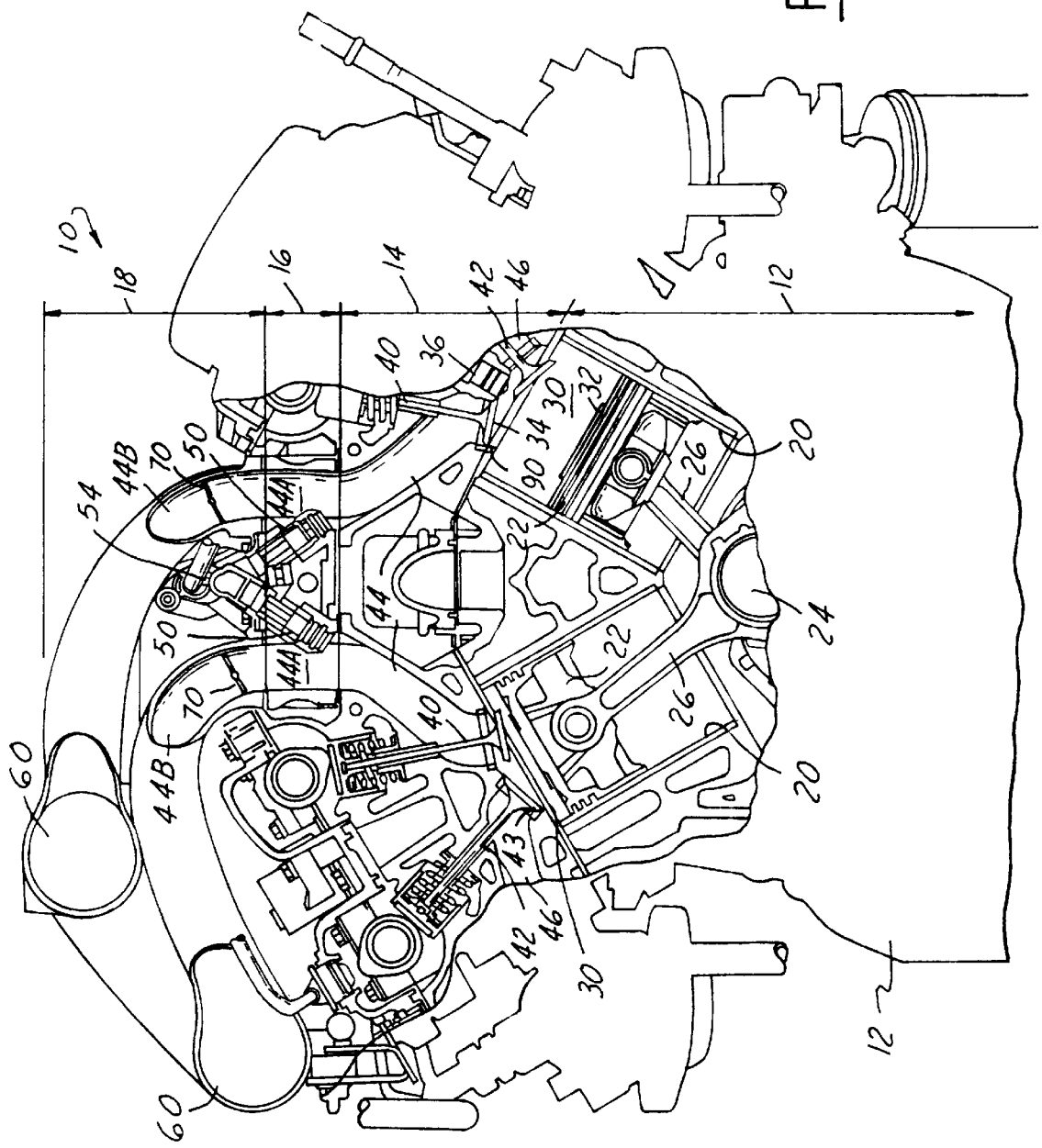

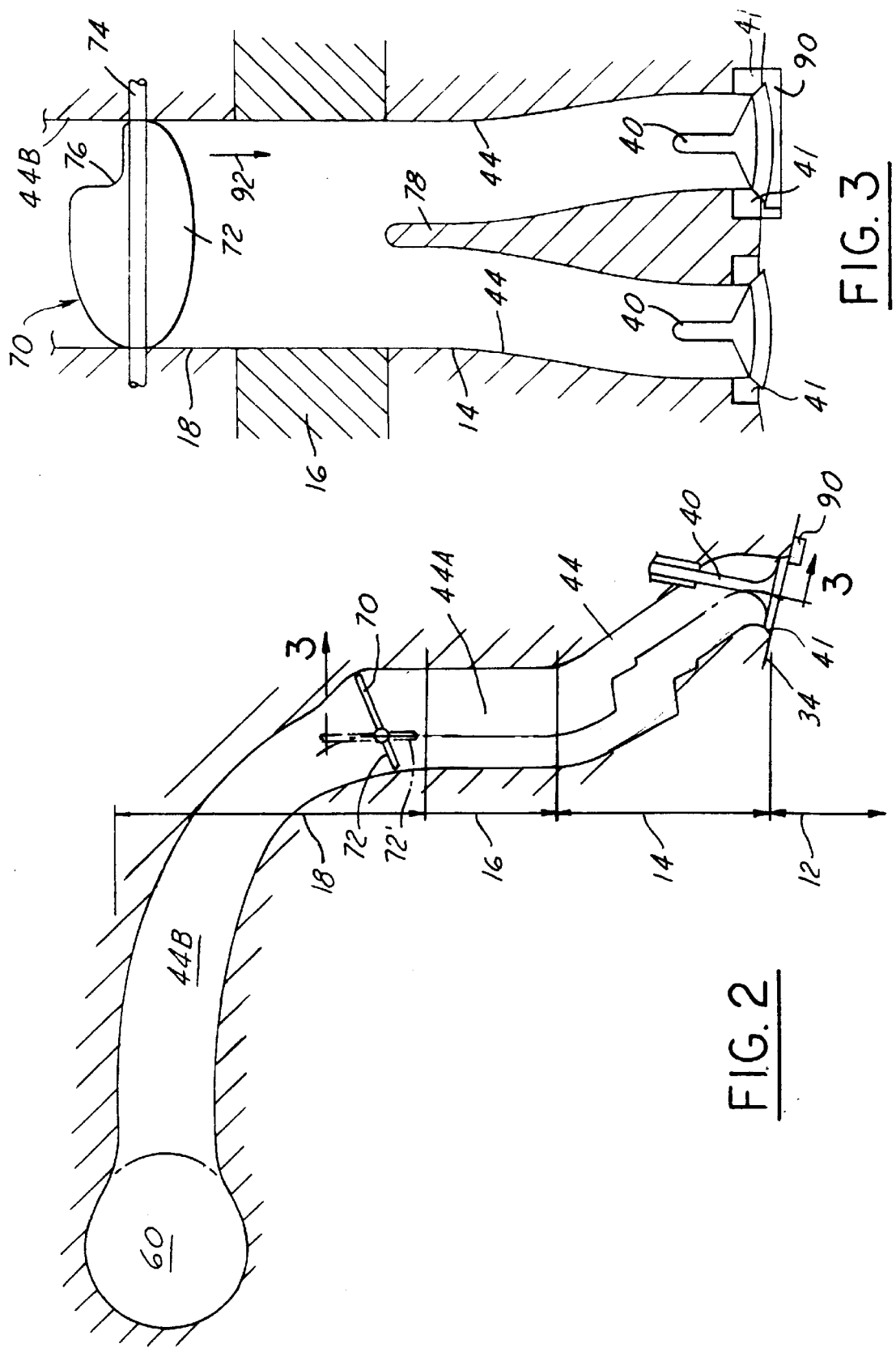

CHARGE MOTION CONTROL VALVE IN UPPER INTAKE MANIFOLD

TECHNICAL FIELD

The present invention relates to internal combustion engines with improved air intake systems and, more particularly, to an engine with an air control valve and bifurcated intake passageway which allows polarization of the air flow into one intake port when desired for improved engine performance, emissions, and fuel economy.

BACKGROUND

In the interests of improving engine performance and fuel economy while reducing undesirable emissions, internal combustion engines are being designed to improve the mixing of intake air and injected fuel in the combustion chamber and to direct the flow of air and air-fuel mixture in order to provide an optimum mixture at the spark plug for ignition. In stratified charge spark-ignited engines, the air-fuel mixture is typically prepared in a non-homogeneous fashion to produce a relatively rich mixture at the spark plug while the remainder of the mixture is relatively lean. For this purpose, various approaches have been used such as incorporating tumble and/or swirl flows of air in the combustion chamber, and the use of various shaped recesses or bowls in the upper surface of the pistons. Changing the placement and/or orientation of the fuel injectors has also been used to provide improved engine performance.

As the rich mixture ignites around the spark plug, it in turn ignites the lean mixture in the main chamber. In such engines, therefore, the air-fuel mixture can be burned completely even if the air-fuel mixture, as a whole, is lean. Accordingly, fuel economy can be improved and gaseous emissions, such as nitrous oxide and carbon monoxide, contained in the exhaust and engine can be reduced.

It is known that combustion in an internal combustion engine can be improved by controlling the amount of turbulence within the combustion chamber. Various mechanisms have been used to introduce certain motion to the air and fuel within the cylinder. Due to the various geometries and structure of some of the engines, however, it is difficult to achieve the requisite tumble and/or swirl-types of air and air-fuel flows in the combustion chamber with some engines.

As a result, a need exists for securing tumble and/or swirl flows of air in certain internal combustion engines in order to produce beneficial charge stratification and improved engine performance and fuel economy while at the same time reducing undesirable emissions.

SUMMARY OF THE INVENTION

The above objects are achieved, and problems with prior approaches are overcome, by an internal combustion engine having a charge motion control valve (CMCV) in the upper intake manifold where it is easier and less expensive to package and assemble. It is preferably to position the CMCV as close to the intake valves as possible, but due to the architecture and structure of some engines, this is not possible. A bifurcated intake passageway is contained in the cylinder head to direct the polarization of the air flow into one intake port when the CMCV plate or valve is closed. The fuel injectors are positioned in the lower intake manifold or cylinder head and direct fuel into the intake ports and into the combustion chambers.

The CMCV has a throttle plate with an opening which is positioned in the upper intake manifold of the engine. A bifurcation partition or wall is positioned in the air intake passageway in the cylinder head in order to capture the polarization of the air flow and direct it into one intake port when the CMCV plate is closed. The CMCV provides a tumble flow of intake air at high engine speeds and a swirl-type air flow at low engine speeds. The benefits achieved by the present invention can be further enhanced when the bifurcation wall is extended such as into the lower intake manifold or into the lower portion of the upper intake manifold.

A deflector can also be positioned adjacent the edge of the intake port into the combustion chamber. The deflector helps direct the air flow into a swirl pattern in the combustion chamber.

BRIEF DESCRIPTION OF THE DRAWINGS

The invention will now be described, by way of example, with reference to the accompanying drawings, in which:

FIG. 1 is a partial cross-sectional view of an internal combustion engine depicting a position of the intake air control valve;

FIG. 2 is a schematic cross-sectional view of an air intake system in accordance with the present invention;

FIG. 3 illustrates a first embodiment of the invention; and

DESCRIPTION OF THE PREFERRED EMBODIMENT(S)

Figure 6:
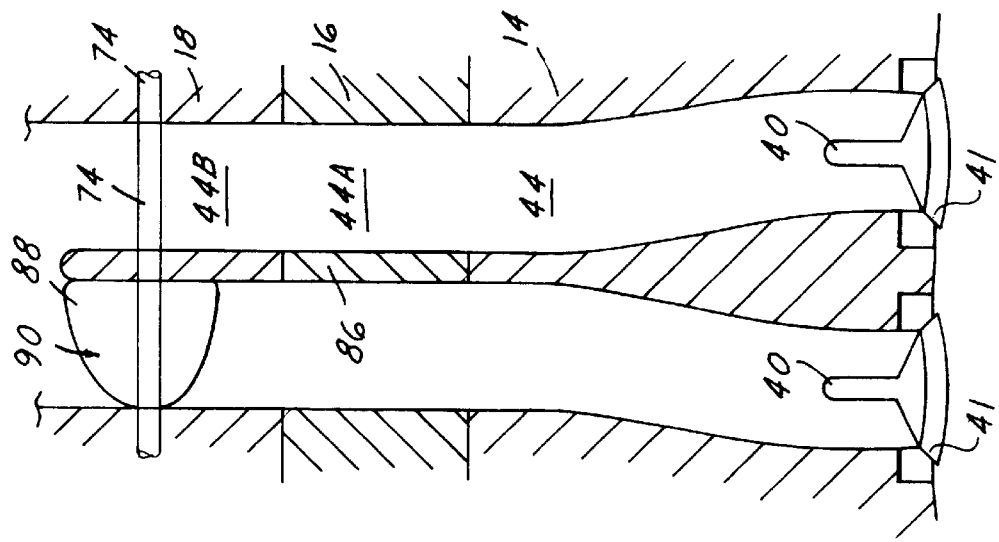
FIGS. 4–6 illustrate alternate embodiments of the invention.

FIG. 1 is a partial cross-sectional view of an internal combustion engine which can be utilized with the present invention. The engine, which is indicated generally by the reference numeral 10, is preferably a 3.0 liter four-valve V-6 modular engine developed by Ford Motor Company. It is understood, of course, that the present invention can be utilized with any internal combustion engine which has a need to improve engine performance and fuel economy, and to reduce undesirable emissions.

The principal parts of the engine which need to be described in order to describe the structure and operation of the present invention are indicated in FIGS. 1 and 2. The engine generally includes an engine block 12, a cylinder head 14, a lower intake manifold 16, and an upper intake manifold mechanism 18. A plurality of cylinders 20 are situated in the cylinder block. A plurality of piston members 22 are also positioned in the cylinder block 12, one of the pistons being positioned in each of the cylinders 20. The pistons are connected to a crank shaft 24 by piston rods 26 and the pistons 22 reciprocate in the cylinders 20 during operation of the engine. Combustion chambers 30 are formed between the upper surfaces 32 of the pistons and the lower surfaces 34 of the cylinder heads 14. The air and fuel mixtures which are directed into the combustion chambers 30 are ignited by spark plugs 36, one of which is positioned in the cylinder head 14 at the upper end of each cylinder.

Preferably, two intake valves 40 and two exhaust valves 42 are positioned in the lower wall 32 of the cylinder head 14 and communicate with the cylinders 20. A portion of the mechanism for operating the valve is shown in FIG. 1 for reference purposes. The operation of the intake valves and exhaust valves is carried out in a conventional manner and does not need to be described further.

Intake passageway 44 and exhaust passageway 46 are positioned in the cylinder head 14. A separate intake passageway and exhaust passageway are provided for each cylinder. A pair of inlet ports 41 are provided in the cylinder head at the end of each inlet passageway. The intake valves 40 reciprocate in the engine and open and close the intake ports 41 in order to allow inlet air to enter the combustion chamber when needed as part of each combustion cycle. Similarly, a pair of exhaust ports 43 are provided in the cylinder head at the end of each exhaust passageway and the exhaust valves 42 reciprocate in order to open and close the exhaust ports 43 during each combustion cycle.

The lower manifold mechanism 16 is positioned directly on and attached to the cylinder head 14. The intake manifold is secured to the cylinder head by bolts or other conventional fasteners. The lower intake manifold includes fuel injectors 50 which are used to inject fuel into each of the intake passages 44. Preferably, one fuel injector 50 is utilized for each combustion chamber. The fuel injectors could also be positioned in the cylinder head.

The intake manifold mechanism 16 also includes continuations of the intake passageways 44A. The intake passageways in the intake manifold are in direct axial alignment with the lower portions of the intake passages 44 which are situated in the cylinder head 14.

Positioned on and connected to the lower intake manifold mechanism 16 is the upper intake mechanism 18. The upper intake manifold 18 includes intake passageway extensions 44B which are in communication and alignment with the intake passages 44A in the lower intake manifold 16. The intake passageways 44B also are in communication with, and connect with, the main manifold passageways 60 which are used to direct intake air into the intake passage systems for each of the cylinders 20.

The upper intake manifold mechanism 18 is securely attached to the lower intake manifold 16 by bolts or other conventional fasteners. Preferably, the upper intake manifold 18, lower intake manifold 16, and cylinder head 14 are all connected together to the engine block 12 with common fasteners. For ease of manufacturing and assembling, the three engine portions, namely the cylinder head, lower intake manifold, and upper intake manifold are manufactured separately and then fastened together during assembly of the engine.

The fuel rail and other components of the fuel delivery system are attached to the injectors 50 and are used to deliver fuel to the fuel injectors. The fuel rail and associated components are indicated by the reference numeral 54 in FIG. 1.

A throttle valve or control valve 70 is positioned in the intake passage 44B in the upper manifold 18. The control valve 70 includes a throttle plate 72 secured to the rotatable shaft or rod 74.

As better shown in FIG. 3, a control valve 70 is positioned in each of the intake passageways. As indicated above, two intake valves 40 are positioned in two intake ports 41 in each of the cylinders. A bifurcation partition or wall 78 is positioned in each of the intake passageways 44 separating the inlet air into two separate air flows directed to the two separate intake valves 40. The dual intake passageway portions meet to form a joint or combined intake passageway 44A in the lower intake manifold portion of the engine.

The throttle plate 72 has a cross-sectional size and shape configured to conform to the shape of the intake passageway 44B. In this regard, in the embodiments shown, the throttle plate has a generally oval configuration which matches that of the intake passageway 44B.

Figure 5:
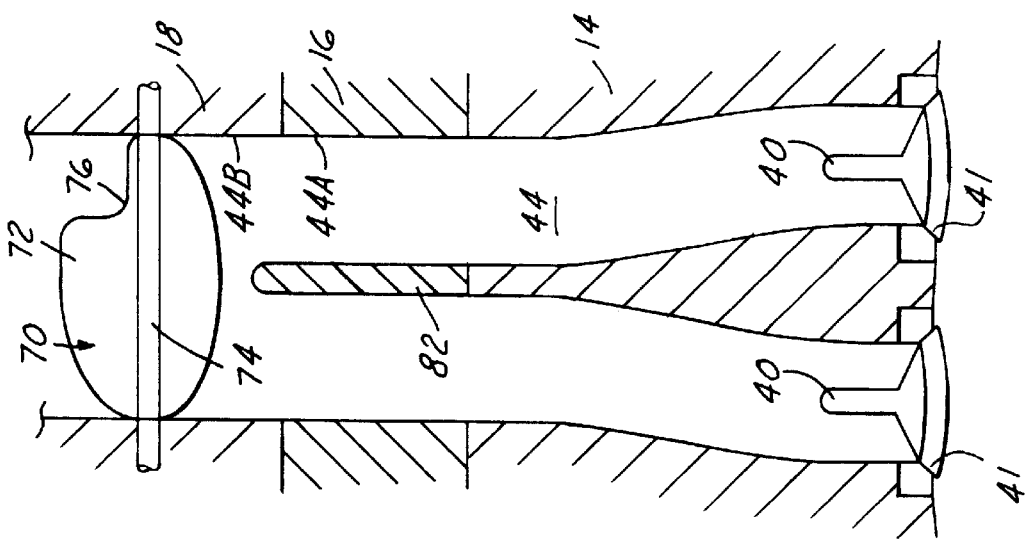
Figure 4:
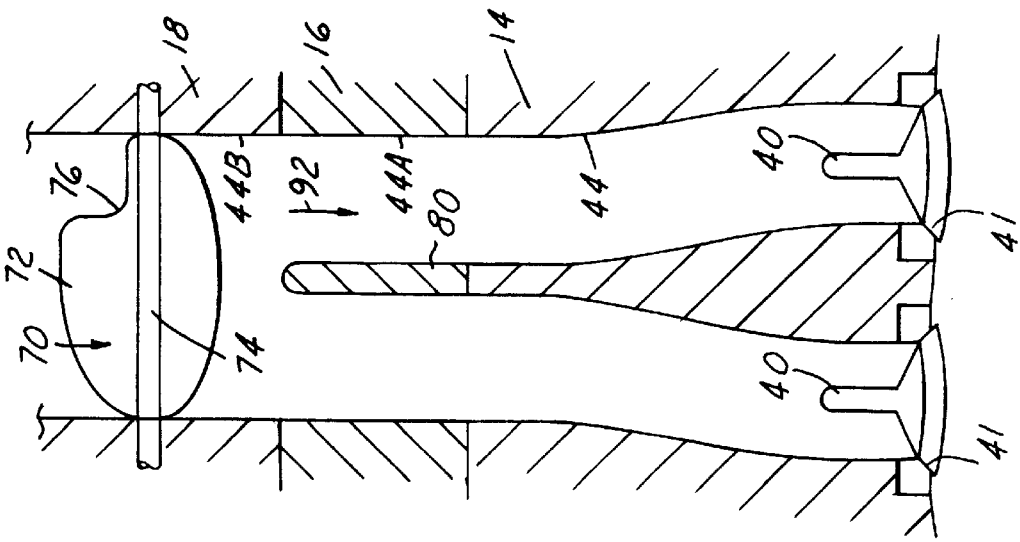

Also, as shown in FIGS. 3–5, the throttle plate 72 has a cut-out portion 76 in one corner. The cut out portion 76 allows air to flow past the throttle plate and into one of the intake passageways in the cylinder head even when the throttle plate is in the closed position blocking the remainder of the intake passageway 44B. The polarization of the air flow allows the majority of the airflow to be directed into one of the intake passageways.

The throttle plate rotates on shaft or rod 74. The rod or shaft 74 can be common to the control valves in all of the cylinders in alignment along one side of the engine 10 and is rotated by a control mechanism (not shown).

With the present invention, as shown in FIG. 3, the throttle plate 72 can be rotated in order to block off air flow to one of the two portions of the intake passages 44 and allow air to flow along the other portion. This produces a swirl flow of air in the cylinder. In this regard, a swirl-type air flow in the cylinder had a rotation which is around the longitudinal axis of the cylinder. In contrast, in a tumble-type air flow, the air rotates around an axis perpendicular to the longitudinal axis of the cylinder.

In order to enhance the swirl-type air flow in the cylinders 20, a deflector mechanism (a/k/a dam or mask) can be positioned at the edge of one of the intake ports 41 as the intake passage 44 enters the combustion chamber. A deflector of this type is shown, for example, in FIGS. 1, 2 and 3 and indicated by the reference numeral 90. The deflector has a curved or semi-circular shape and is approximately three millimeters in height. The deflector 90 directs air flow in a swirl-type direction in the cylinder as the valve 40 opens and the air flow is initially directed into the cylinder.

For tumble-type air flows in the cylinder 20, the control valve 70 is rotated around the rod or shaft 74 so that the throttle plate 72 is positioned in line with the longitudinal axis of the intake passage 44B. This is shown in phantom lines 72' in FIG. 2. With the throttle plate 72' in the position shown, a full complement of intake air is allowed to proceed through the intake passages 44A and 44 and into the cylinder 20 through both intake ports 41 in a basically vertical direction.

Preferably, the present invention provides a swirl-type air flow in the cylinders at low engine speeds and a tumble-type air flow at high engine speeds. The separation between high and low engine speeds depends on the particular engine, but generally is in the range of 1,500–3,000 rpm.

The bifurcation wall or partition 78 is preferably extended as far as necessary into the intake passageway system in order to keep the two air flow portions separate when the throttle plate 72 is rotated to close off the air passage. For example, as shown in FIG. 3, when the throttle plate is closed, the air flow directed toward opening 76 in throttle plate 72 is directed in the line of the arrow 92 into one of the two intake ports.

In this regard, in order to keep the air flow separate and direct it only into one intake port, the partition or bifurcation wall 78 can be extended further into the air intake passageway system. For example, as shown in FIG. 4, the partition 80 is extended into the lower intake manifold 16. Further, as shown in FIG. 5, the bifurcation wall 82 can be extended past the lower intake manifold 16 and into the upper intake manifold 18.

As a still further embodiment of the present invention, the partition wall can be extended up to, and become part of, the control valve itself. This is shown in FIG. 6 where the partition or bifurcation wall 86 is extended past the rod or shaft 74 of the throttle plate 88. In this regard, the control valve 90 is only positioned in one of the two sides of the bifurcated intake passageway since air flow is always desired in at least a portion of the intake passageway and into the cylinder during operation of the engine. With the embodiment shown in FIG. 6, the throttle plate 88 when rotated only blocks off one-half of the intake passageway. When the throttle plate 88 is positioned in line with the air flow, a full complement of air is directed into the cylinder through both intake ports. The embodiment illustrated in FIG. 6 is also called an intake manifold runner control (IMRC).

The present invention allows the use of a charge motion control valve (CMCV) or an intake manifold runner control (IMRC) device on an internal combustion engine to improve engine performance, reduce undesirable emissions, and improve fuel economy with easier packaging and consequently reduced costs. In this regard, certain engines similar to the one shown in FIG. 1 have a configuration or package which will not allow positioning of a control valve (or throttle plate) adjacent the cylinder in order to more effectively control the flow of air into one intake port or the other. With the engine shown, the control valve is approximately 200 millimeters or greater from the intake ports. The positioning of the control valve is a challenge with compact V-shaped engine of the type shown.

In an alternative design, it is possible to move the fuel injector 50 over to one side of the intake passageway in order to insure that the fuel is injected along the side of the intake passageway which is always opened into the cylinder. In a still further embodiment, two fuel injectors can be utilized for each cylinder, one injector positioned on each side of the intake passageway and controlled to operate only when the particular side of the air passageway is opened into the cylinder. The fuel injector could also be adapted to spray fuel into both intake ports.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. An internal combustion engine comprising:
   a six-cylinder engine block having six cylinders arranged in a V-6 configuration;
   a cylinder head attached to said engine block, said cylinder head having a lower surface adjacent each of said cylinders;
   a lower intake manifold attached to said cylinder head;
   an upper intake manifold attached to said lower intake manifold;
   six intake passageways extending through said upper intake manifold, said lower intake manifold and said cylinder head, each of said passageways being in communication with one of said cylinders;
   each of said intake passageways being divided into two channels at least in said cylinder head;
   a pair of intake ports in said lower surface of said cylinder head adjacent each of said cylinders; one of said pair of intake ports being positioned in each of said channels;
   an intake valve positioned in each of said intake ports;
   a control valve positioned in each of said six passageways in said upper intake manifold for controlling the flow of intake air through said passageways and into said six cylinders;
   each of said control valves having a throttle plate attached to a rotatable shaft member; and
   a plurality of fuel injectors positioned in said lower intake manifold for injecting fuel into each of said intake passageways;
   said two channels forming each of said intake passageways extending at least into said lower intake manifold.

2. The internal combustion engine as set forth in claim 1 in which said two channels extend into said upper intake manifold.

3. The internal combustion engine as set forth in claim 1 further comprising a deflector member positioned on said lower surface adjacent one of said pair of intake ports in each of said cylinders for initiating a swirl flow of intake air in said cylinders.

4. The internal combustion engine as set forth in claim 1 wherein each of said throttle plates has an opening therein in axial alignment with one of said channels.

\* \* \* \* \*